United States Patent
Vandewalle et al.

(10) Patent No.: US 12,433,768 B2
(45) Date of Patent: Oct. 7, 2025

(54) EXTRACTOR FOR REMOVAL OF AN ORTHOPEDIC PROSTHESIS

(71) Applicant: Zimmer, Inc., Warsaw, IN (US)

(72) Inventors: Daniel Vandewalle, Warsaw, IN (US); James S. Collins, Fort Wayne, IN (US)

(73) Assignee: Zimmer, Inc., Warsaw, IN (US)

( * ) Notice: Subject to any disclaimer, the term of this patent is extended or adjusted under 35 U.S.C. 154(b) by 87 days.

(21) Appl. No.: 18/425,351

(22) Filed: Jan. 29, 2024

(65) Prior Publication Data

US 2024/0252326 A1    Aug. 1, 2024

Related U.S. Application Data

(60) Provisional application No. 63/442,024, filed on Jan. 30, 2023.

(51) Int. Cl.
*A61F 2/46* (2006.01)
*A61F 2/38* (2006.01)
*A61F 2/30* (2006.01)

(52) U.S. Cl.
CPC .............. *A61F 2/461* (2013.01); *A61F 2/389* (2013.01); *A61F 2002/30387* (2013.01); *A61F 2002/30433* (2013.01); *A61F 2002/30553* (2013.01); *A61F 2002/4619* (2013.01); *A61F 2002/4681* (2013.01)

(58) Field of Classification Search
CPC ......... A61F 2/461; A61F 2/4603; A61B 17/92
See application file for complete search history.

(56) References Cited

U.S. PATENT DOCUMENTS 4,459,985 A * 7/1984 McKay ................... A61F 2/461
606/100

\* cited by examiner

*Primary Examiner* — Andrew Yang
(74) *Attorney, Agent, or Firm* — SCHWEGMAN LUNDBERG & WOESSNER, P.A.

(57) ABSTRACT

According to one example, an extractor may include a main body and a coupling mechanism. The main body can include a slot configured to receive a fastener that couples the extractor to the tibial prosthesis, a groove extending to a lateral side and a medial side of the slot and a projection at least partially defining a side wall of the groove. The coupling mechanism can be connected to the main body and configured to connect with an instrument.

20 Claims, 9 Drawing Sheets

EXTRACTOR FOR REMOVAL OF AN ORTHOPEDIC PROSTHESIS

CLAIM OF PRIORITY

This application claims the benefit of U.S. Provisional Patent Application Ser. No. 63/442,024, filed on Jan. 30, 2023, the benefit of priority of which is claimed hereby, and which is incorporated by reference herein in its entirety.

FIELD

The present subject matter relates to the removal of orthopedic prostheses from bone and, more particularly, to an extractor used in knee arthroplasties including revision knee arthroplasties.

BACKGROUND

Orthopedic procedures and prostheses are commonly utilized to repair and/or replace damaged bone and tissue in the human body. For example, a knee arthroplasty can be used to restore natural knee function by repairing damaged or diseased articular surfaces of the femur and/or tibia. An incision is made into the knee joint to expose the bones comprising the joint. Cut guides are used to guide the removal of the articular surfaces that are to be replaced. Prostheses are used to replicate the articular surfaces. Knee prostheses can include a femoral component implanted on the distal end of the femur, which articulates with a tibial bearing component and a tibial component implanted on the proximal end of a tibia to replicate the function of a healthy natural knee. Various types of arthroplasties are known including a total knee arthroplasty, where all of the articulating compartments of the joint are repaired with prosthetic components and revision knee arthroplasty where previously implanted prosthetic components are removed and replaced with new prosthetic components.

Overview

This disclosure pertains generally to instruments used for a knee arthroplasty including a revision knee arthroplasty. The present inventors have recognized, among other things, that primary (or revision) tibial prostheses can be difficult to remove in preparation for a new revision knee prosthesis. Techniques for the removal of the prosthesis vary greatly. Simply using a slap hammer for extraction may not be desirable as the slap hammer can damage threads and can damage the tibia if not utilized at a proper angle during the extraction. The present inventors have proposed an extractor that can be utilized to simplify removal of the tibial prosthesis and can reduce the possibility of damage to the tibia. In particular, the extractor can provide for multiple locations of engagement with the tibial prosthesis and can act as a guide for a slap hammer. This multi-point engagement can reduce loading on the threads of the tibial prosthesis and can allow the slap hammer to be utilized with the extractor with less likelihood of damaging the tibia.

Furthermore, present inventors have recognized an extractor design that can be utilized with multiple standard sizes of tibial prostheses. Indeed, a single extractor can be utilized with all the standard sizes of the tibial prosthesis according to some examples. Thus, a system or method for removal of the tibial prosthesis need only provide a single extractor rather than multiple extractors each configured specifically for different sizes of the tibial prosthesis. As such, a number of parts used during the procedure can be reduced. This can save cost and reduce surgical complexity.

To further illustrate the apparatuses, systems and methods disclosed herein, the following non-limiting examples (referred to as techniques and aspects below) are provided. These examples can be combined in any manner, for example, one or more elements of one example can be combined with one or more elements of another example.

In some aspects, the techniques described herein relate to an extractor for a tibial prosthesis optionally including: a main body including: a slot configured to receive a fastener that couples the extractor to the tibial prosthesis; a groove extending to a lateral side and a medial side of the slot; and a projection at least partially defining a side wall of the groove; a coupling mechanism connected to the main body and configured to connect with an instrument.

In some aspects, the techniques described herein relate to an extractor, wherein optionally the coupling mechanism includes a projection with a threaded bore.

In some aspects, the techniques described herein relate to an extractor, wherein optionally the extractor is configured to be positionally adjustable proximal-distal on a proximal surface of the tibial prosthesis as defined by the slot and the fastener.

In some aspects, the techniques described herein relate to an extractor, wherein optionally the groove communicates with the slot.

In some aspects, the techniques described herein relate to an extractor, wherein optionally the projection is configured to insert into a dovetail of a boss of the tibial prosthesis.

In some aspects, the techniques described herein relate to an extractor, wherein optionally the boss includes a two-prong boss and the projection and groove engage a tip portion of each prong of the two-prong boss.

In some aspects, the techniques described herein relate to an extractor, wherein optionally the slot is configured to receive a head of the fastener and a threaded portion of the fastener is received by a threaded bore of the tibial prosthesis.

In some aspects, the techniques described herein relate to an extractor, wherein optionally the main body includes a ramp adjacent to the slot that is engaged by the head of the fastener to move the projection and groove into mating engagement with a coupling feature of the tibial prosthesis.

In some aspects, the techniques described herein relate to a system for use in a knee arthroplasty optionally including: a tibial prosthesis having a proximal surface, an aperture with an opening to a threaded aperture at the proximal surface, a boss, and a distal surface configured to be disposed on a resected proximal surface of a tibia; a fastener configured to thread into the threaded aperture of the tibial prosthesis; and an extractor configured to remove the tibial prosthesis from the tibia, wherein the extractor includes a slot configured to receive a head of the fastener, and wherein the extractor includes one or more features configured to engage the boss.

In some aspects, the techniques described herein relate to a system, further optionally including a slap hammer configured to connect to the extractor.

In some aspects, the techniques described herein relate to a system, wherein optionally the extractor is configured to be positionally adjustable proximal-distal on the proximal surface of the tibial prosthesis as defined by the slot and the fastener.

In some aspects, the techniques described herein relate to a system, wherein optionally the one or more features include a groove that extends to a medial and lateral side of the slot, wherein the groove communicates with the slot.

In some aspects, the techniques described herein relate to a system, wherein optionally the one or more features include a projection is configured to insert into a dovetail of the boss.

In some aspects, the techniques described herein relate to a system, wherein optionally the boss includes a two-prong boss and the one or more features are configured to engage a tip portion of each prong of the two-prong boss.

In some aspects, the techniques described herein relate to a system, wherein optionally the extractor includes a ramp adjacent to the slot that is engaged by the head of the fastener to move the one or more features to engage the boss.

In some aspects, the techniques described herein relate to a method removing a tibial prosthesis for a knee arthroplasty, the method optionally including: placing an extractor on a proximal surface of the tibial prosthesis; receiving a fastener with a slot of the extractor; threading the fastener into the tibial prosthesis until a head of the fastener engages the extractor; and engaging the extractor against a boss of the tibial prosthesis.

In some aspects, the techniques described herein relate to a method, wherein optionally engaging the head of the fastener against the extractor moves the extractor into the engaging the extractor against the boss.

In some aspects, the techniques described herein relate to a method, further optionally including connecting a slap hammer to the extractor.

In some aspects, the techniques described herein relate to a method, wherein optionally the boss includes a two-prong boss and the extractor engages a tip portion of each prong of the two-prong boss.

In some aspects, the techniques described herein relate to a method, wherein optionally the extractor is configured to insert into a dovetail of the boss.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

DETAILED DESCRIPTION

The present application relates instruments such as an extractor other components, systems, and methods. The extractor, for example, can be used to remove a tibial prosthesis from a tibia during a revision knee arthroplasty.

As used herein, the terms "proximal" and "distal" should be given their generally understood anatomical interpretation. The term "proximal" refers to a direction generally toward the torso of a patient, and "distal" refers to the opposite direction of proximal, i.e., away from the torso of a patient. It should be understood that the use of the terms "proximal" and "distal" should be interpreted as though the patient were standing with the knee joint in flexion. The intent is to differentiate the terms "proximal" and "distal" from the terms "anterior" and "posterior". As used herein, the terms "anterior" and "posterior" should be given their generally understood anatomical interpretation. Thus, "posterior" refers to a rear of the patient, e.g., a back of the knee. Similarly, "anterior" refers to a front of the patient, e.g., a front of the knee. Thus, "posterior" refers to the opposite direction of "anterior". Similarly, the term "lateral" refers to the opposite direction of "medial" and these terms should be given their generally understood anatomical interpretation.

Figure 1A:
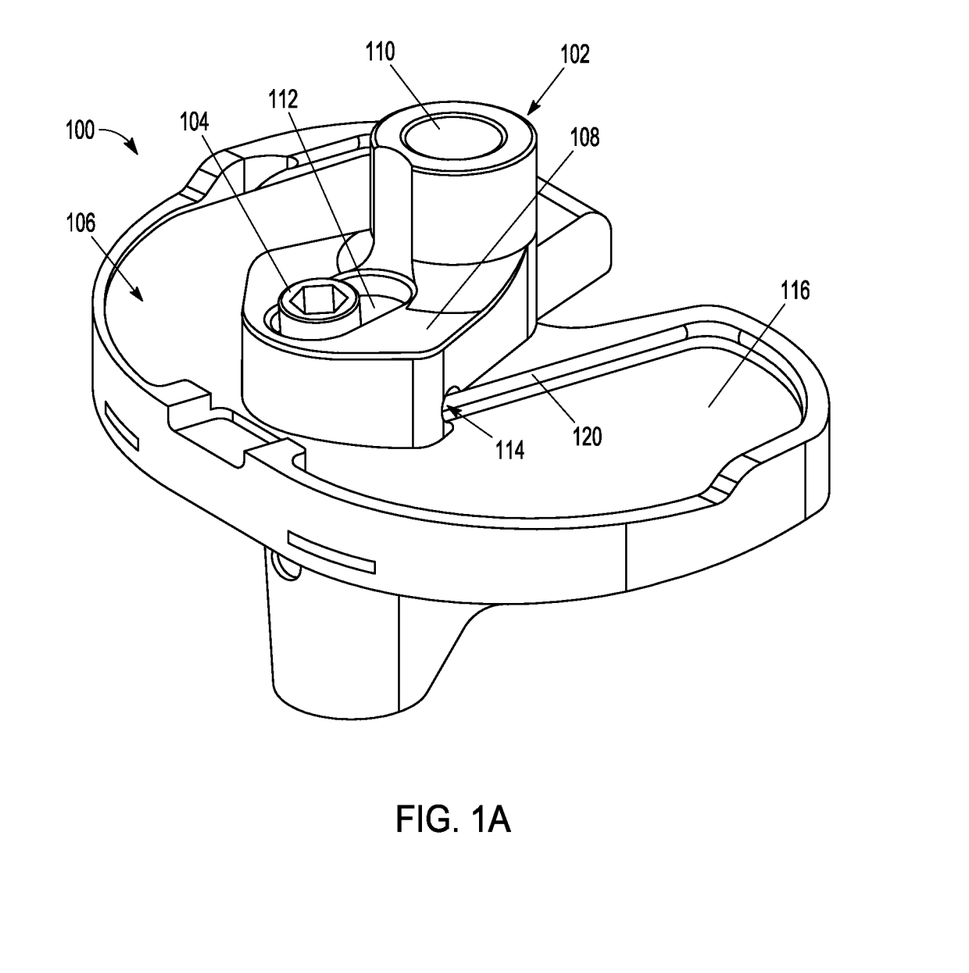
FIG. 1A is a perspective view of a prosthesis assembly including an extractor, a fastener and a tibial prosthesis according to an example of the present application.
Figure 1B:
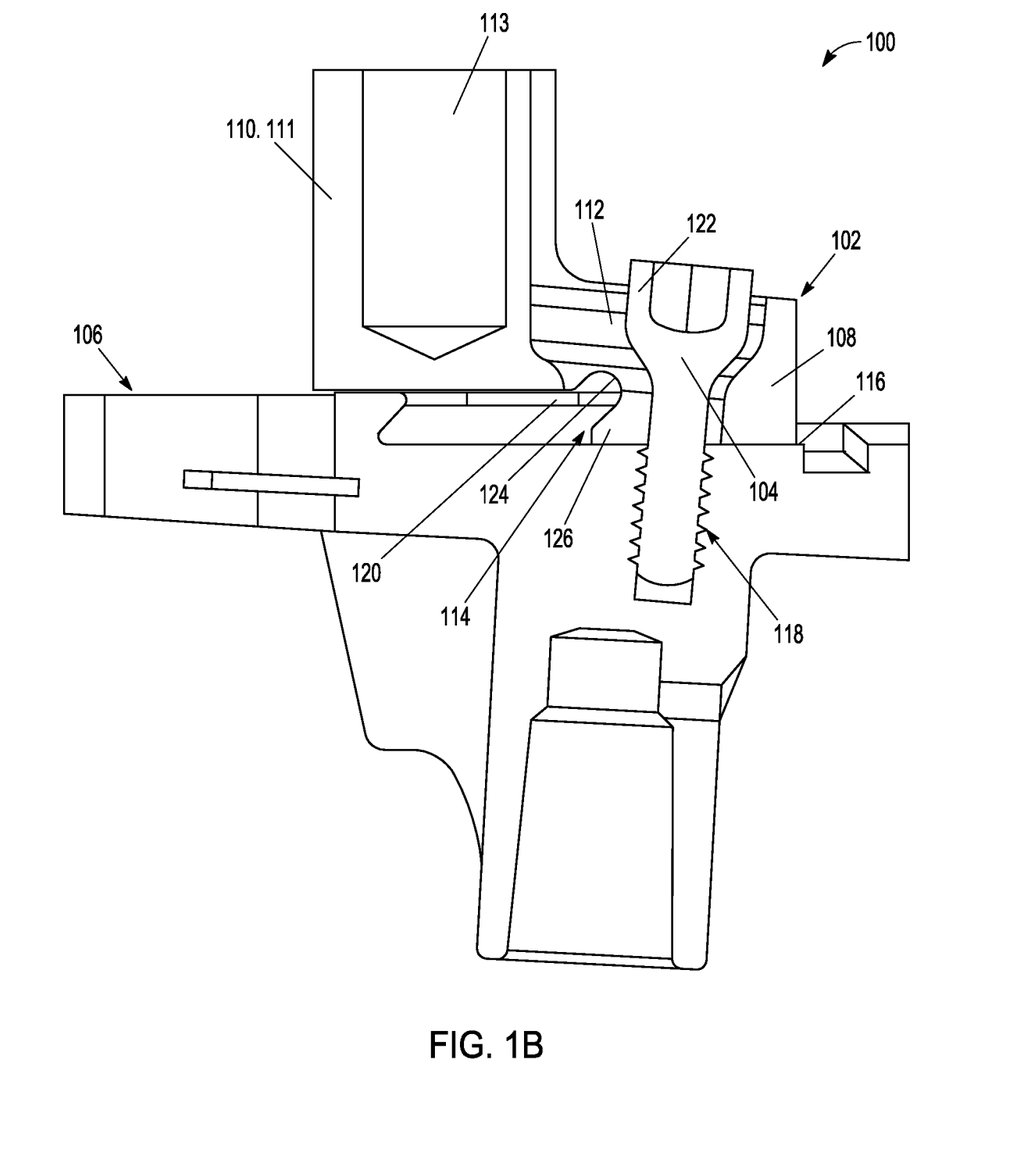
FIG. 1B show a cross-sectional view of the prosthesis assembly of FIG. 1A showing the fastener coupling the extractor to the tibial prosthesis according to an example of the present application.

FIGS. 1A and 1B illustrate a prosthesis assembly 100 that can include an extractor 102, a fastener 104 and a tibial prosthesis 106. In the example of FIG. 1A, the prosthesis assembly 10 is shown in a perspective view. FIG. 1B shows the prosthesis assembly 100 in a cross-sectional view along a sagittal plane.

The extractor 102 can include a main body 108, a coupling mechanism 110, a slot 112 and one or more features 114. The tibial prosthesis 106 can include a proximal surface 116, an aperture 118 (FIG. 1B) and a boss 120.

The main body 108 can be positioned on the proximal surface 116 adjacent the aperture 118. The main body 108 specifically the one or more features 114 thereof can selectively engage the boss 120 as further illustrated and described herein. The main body 108 can form the slot 112 and the one or more features 114. The coupling mechanism 110 can be coupled to and can extend from the main body 108. The coupling mechanism 110 can be a projection 111 with a threaded bore 113 as shown in FIG. 1B, for example. However, other mechanical features for coupling the extractor 102 with an instrument such as a slap hammer are also contemplated.

According to the examples provided herein, the extractor 102 is coupled to the tibial prosthesis 106 by the fastener 104 (e.g., a screw), which is threaded into the aperture 118 in the tibial prosthesis 106 as shown in FIG. 1B. A head 122 of the fastener 104 can be received by the slot 112 of the extractor 102 and can contact the main body 108 when the fastener 104 is fully seated into the tibial prosthesis 106. The extractor 102 additionally engages the boss 120 of the tibial prosthesis 106 with the one or more features 114 (FIG. 1B) such as a groove 124 (FIG. 1B) and a projection 126 (FIG. 1B).

As shown in FIG. 1B, the aperture 118 can be canted so as to be angled anterior-posterior in addition to extending proximal-distal. This angulation can angle the fastener 104 and aid in moving the extractor 102 to the posterior when the fastener 104 is engaged with the extractor 102 such that the one or more features 114 move into engagement with the boss 120.

Figure 2:
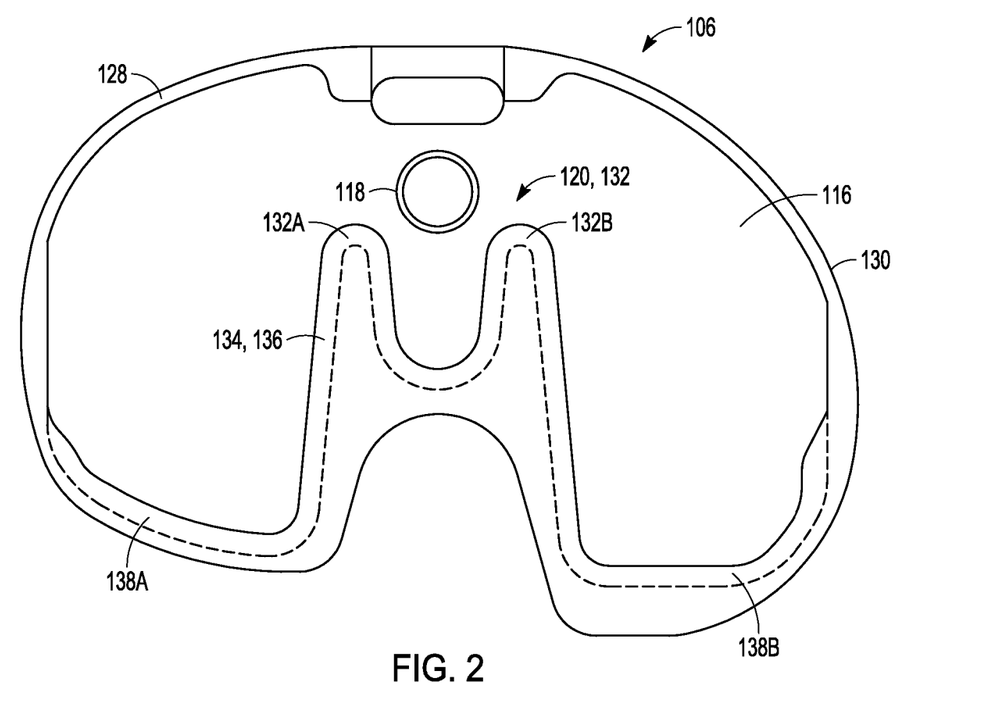
FIG. 2 is a top plan view of the tibial prosthesis of FIGS. 1A-1B.

FIG. 2 shows a plan view of the tibial prosthesis 106 including the proximal surface 116, the aperture 118 and the boss 120.

A tibial bearing component (not shown) can be secured to the tibial prosthesis 106. Such securement can be facilitated by the use of rails, notches, bosses and other features including a fastener (not shown) received in the aperture 118. In addition to the proximal surface 116, the tibial prosthesis 106 has a distal surface configured to interface with and abut a resected surface of the tibia (not shown). The proximal surface 116 can be generally flat or angulated as desired. The boss 120 can project above the proximal surface 116. The aperture 118 can have an opening at the proximal surface 116 and can be generally centrally located.

As shown in FIG. 2, the tibial prosthesis 106 can include a rail 128 extending from the proximal surface 116 along a periphery 130. FIG. 2 also illustrates the boss 120 is a two prong boss 132 having a first prong 132A and a second prong 132B. The boss 120 can have a dovetail notch 134 and an overhang portion 136. Additionally, peripheral undercut notches 138A and 138B can be provided along portions of the rail 128. The rail 128 and the boss 120 can be configured to attach to corresponding undercut notches and/or other features of the tibial bearing component, for example.

Figure 3:
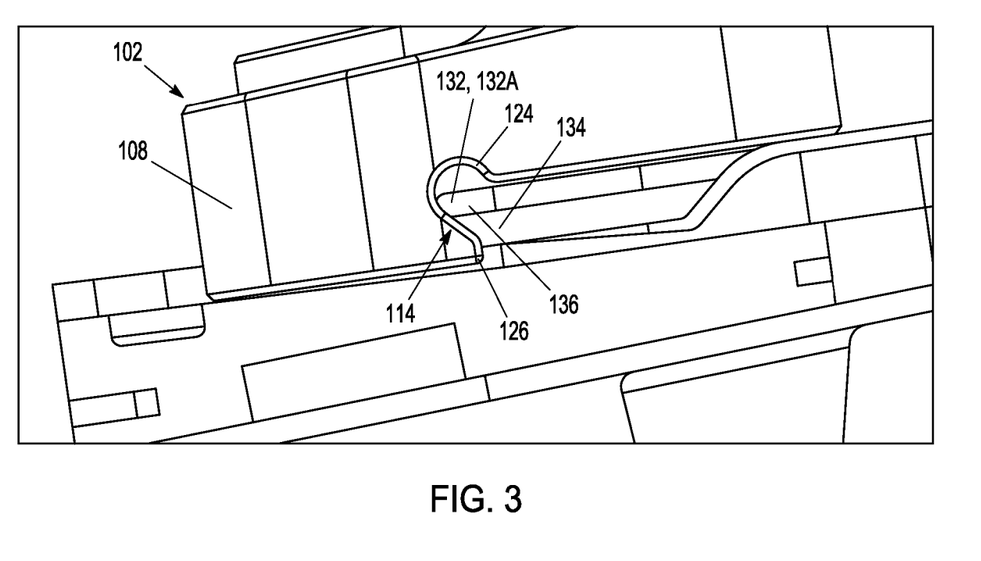
FIG. 3 is a perspective view of the prosthesis assembly of FIGS. 1A-1B with the extractor engaging a boss according to an example of the present application.

FIG. 3 shows the extractor 102 with the one or more features 114 including the groove 124 and the projection 126 engaging the first prong 132A of the two prong boss 132. In particular, the projection 126 can insert into the dovetail notch 134 and the groove 124 can receive the overhang portion 136. Portions of the main body 108 distal of the coupling mechanism 110 (FIGS. 1A and 1B) can be configured to extend over and can be positioned on or above the two prong boss 132.

Figure 4A:
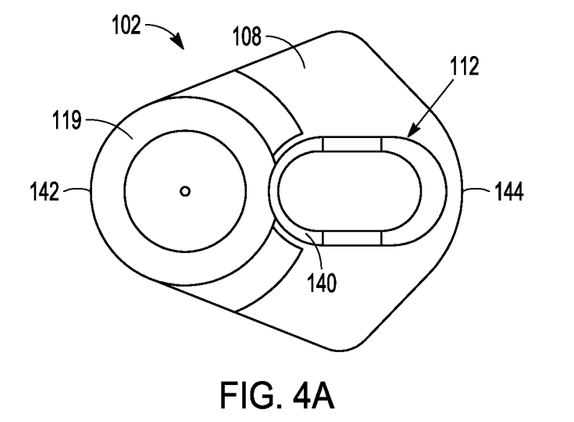
FIGS. 4A-4D show the extractor from various sides according to an example of the present application.
Figure 4B:
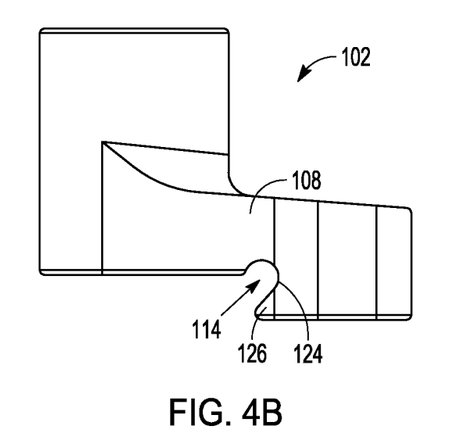
Figure 4C:
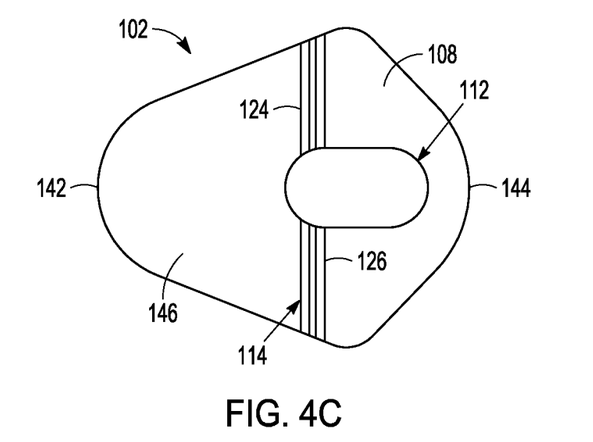
Figure 4D:
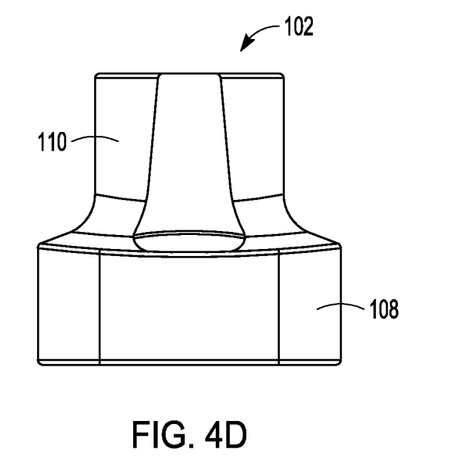

FIGS. 4A-4D show the extractor 102 with the main body 108. FIGS. 4A, 4B and 4D show the coupling mechanism 110. FIGS. 4A and 4D show the slot 112. FIGS. 4B and 4C show the one or more features 114 including the groove 124 and the projection 126.

The main body 108 can have a step configuration proximal-distal with a portion that defines the slot 112 extending more distal than a second portion that is coupled with the coupling mechanism 110. This step can be at least partially defined by the groove 124 and the projection 126 as shown in FIG. 4B. The main body 108 can define the slot 112 and additionally can define a ramp 140 or chamfer adjacent to or within the slot 112 as shown in FIG. 4A. The ramp 140 can be angled or otherwise shaped to be contacted by the head 122 (FIG. 1B) of the fastener 104 (FIG. 1B) when the fastener 104 is fully seated into the slot 112. The configuration of the ramp 140 in addition to the angulation of the aperture 118 discussed in above in reference to FIG. 1B can force the projection 126 and the groove 124 to move into mating engagement with the boss.

As shown in FIG. 4A and FIG. 4C, the extractor 102 can be generally wedge shaped with an increasing cross-sectional area along a majority of the main body 108 and/or distal portion of the coupling mechanism 110 when traveling from a posterior end 142 toward the anterior. An anterior portion of the extractor 102 can be arcuate or otherwise curved to a reduced cross-sectional area at an anterior tip 144. As shown in FIG. 4C, the groove 124 and the projection 126 can extend across an entirety or substantially an entirety of a distal surface 146 of the extractor 102 in a generally medial-lateral direction. Thus, the groove 124 can extend to a lateral side and a medial side of the slot 112. The groove 124 and/or projection 126 can extend all the way to a medial edge and a lateral edge of the extractor. The projection 126 can at least partially define a side wall of the groove 124. The groove 124 can communicate with the slot 112. Thus, the slot 112 can interrupt/intersect a medial-lateral extent of the groove 124 and/or projection 126.

The shape of the extractor 102 such as the generally wedge shaped configuration described and the configuration of the groove 124 and the projection 126 (e.g., with a general medial-lateral extent across the distal surface 146) can result in a single extractor 102 being used with multiple different sizes (or all sizes) of the tibial prosthesis. Furthermore, the slot 112 allows for general anterior-posterior position adjustment of the extractor 102 relative to the tibial prosthesis 106 to a desired position prior to the extractor 102 being coupled thereto with the fastener 104. Thus, the extractor 102 is configured to be positionally adjustable proximal-distal on the proximal surface of the tibial prosthesis 106 as defined by the slot 112 and the fastener 104.

Figure 5:
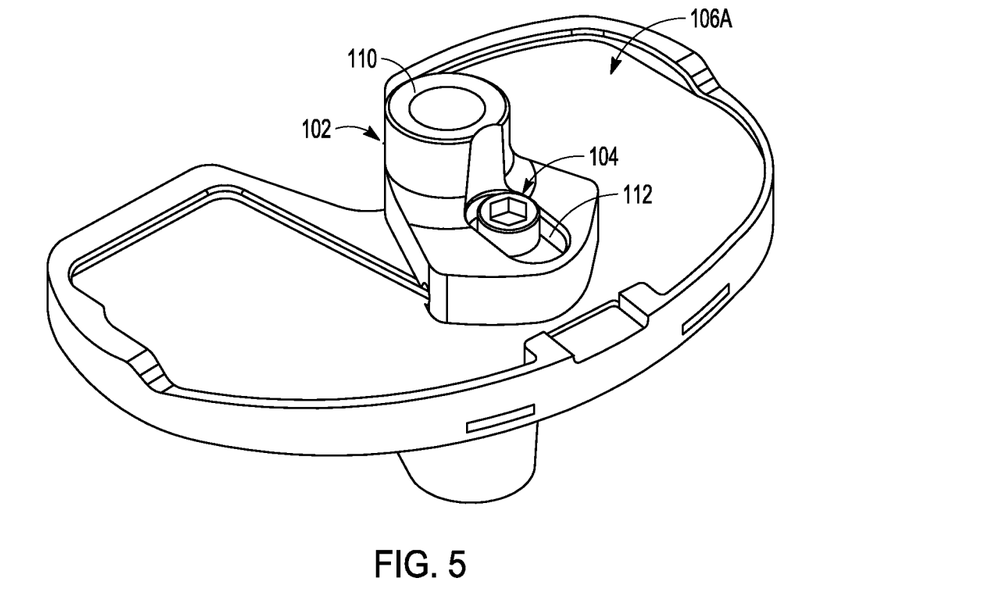
FIG. 5 shows the extractor and the fastener used with a first standard size of the tibial prosthesis according to an example of the present application.

FIG. 5 shows the extractor 102 and the fastener 104 used with a first tibial prosthesis 106A. The fastener 104 is captured by the slot 112 in a more posterior position such as adjacent the coupling mechanism 110. This position for the fastener 104 is due to the aperture 118 (FIG. 2) and the boss 120 (FIG. 2) of the first tibial prosthesis 106A being spaced a first distance apart. In this position for the extractor 102 and the fastener 104, the one or more features 114 (FIGS. 1B and 3) can engage the boss 120 (in particular the first prong 132A and the second prong 132B) of the tibial prosthesis 106A as previously discussed and illustrated in FIGS. 1B and 3.

Figure 6:
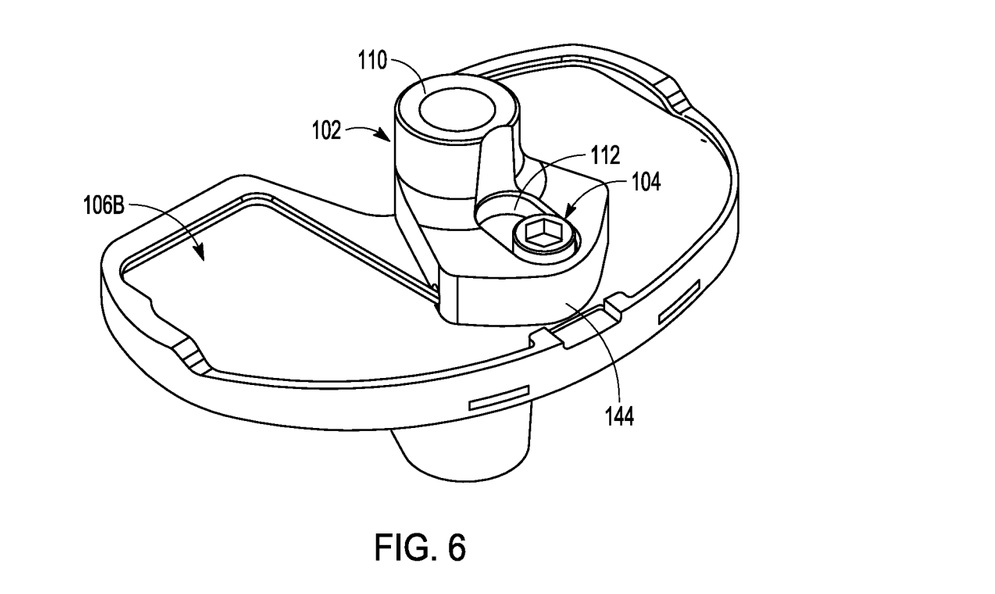
FIG. 6 shows the extractor and the fastener used with a second standard size of the tibial prosthesis according to an example of the present application.

FIG. 6 shows the extractor 102 and the fastener 104 used with the tibial prosthesis 106B. The fastener 104 is captured by the slot 112 in a more anterior position such as adjacent an anterior end of the slot 112 adjacent the anterior tip 144 of the extractor 102. This position for the fastener 104 is due to the aperture 118 (FIG. 2) and the boss 120 (FIG. 2) of the second tibial prosthesis 106B being spaced a second distance apart. This second distance differs from the first distance of FIG. 5. Thus, the fastener 104 can be relatively further away from the coupling mechanism 110 than in the arrangement of FIG. 5. In this position for the extractor 102 and the fastener 104, the one or more features 114 (FIGS. 1B and 3) can engage the boss 120 (in particular the first prong 132A and the second prong 132B) of the tibial prosthesis 106B as previously discussed and illustrated in FIGS. 1B and 3.

Figure 7:
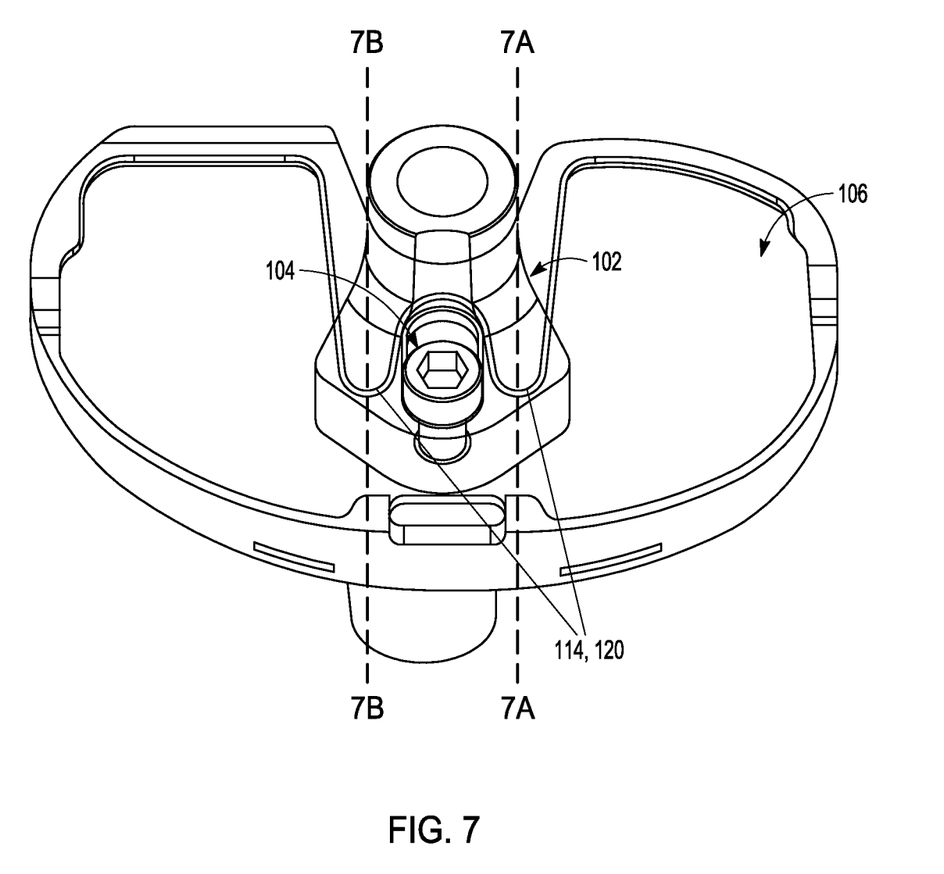
FIG. 7 shows the prosthesis assembly of FIGS. 1A-1B with the extractor shown in phantom having two contact regions at tip portions of prongs of the boss according to an example of the present application.
Figure 7A:
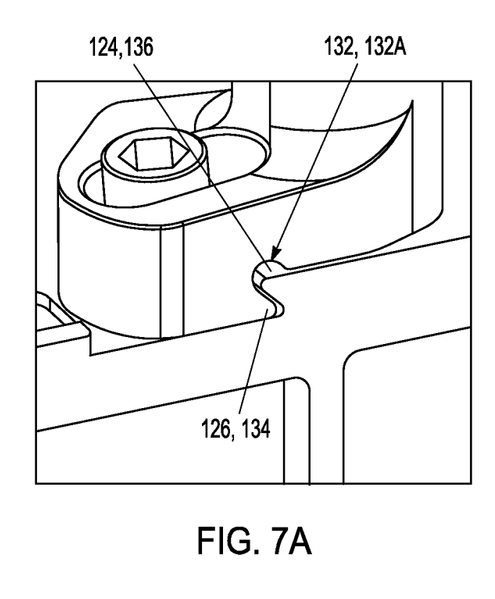
FIG. 7A is an enlarged cross-sectional view of engagement between the extractor and the boss at a first tip portion of a first prong of the boss.
Figure 7B:
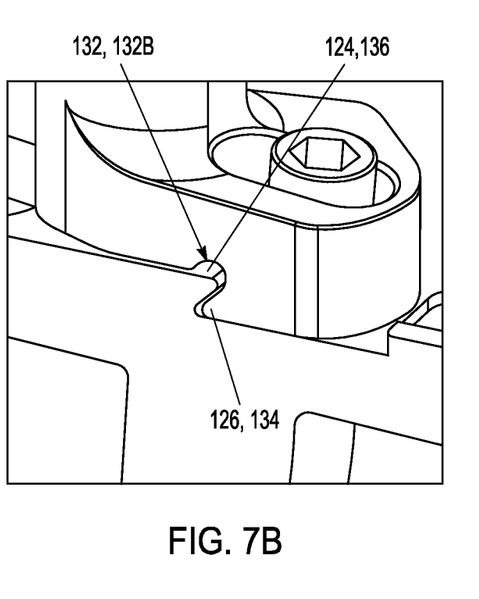
FIG. 7B is an enlarged cross-sectional view of engagement between the extractor and the boss at a second tip portion of a second prong of the boss FIG. 2.

FIG. 7 shows the extractor 102 in phantom and locked down to the tibial prosthesis 106 by the fastener 104. FIG. 7 further illustrates points or regions of contact between the one or more features 114 and the boss 120 where additional engagement between the extractor 102 and the tibial prosthesis 106 occurs. More particularly, the cross-section of FIG. 7A shows the groove 124 and the projection 126 engaging a tip portion of the first prong 132A of the two prong boss 132. This can be due to the projection 126 inserting into the dovetail notch 134 and the groove 124 receiving the overhang portion 136. The cross-section of FIG. 7B shows the groove 124 and the projection 126 engaging a tip portion of the second prong 132B of the two prong boss 132. This can be due to the projection 126 inserting into the dovetail notch 134 and the groove 124 receiving the overhang portion 136.

Figure 8A:
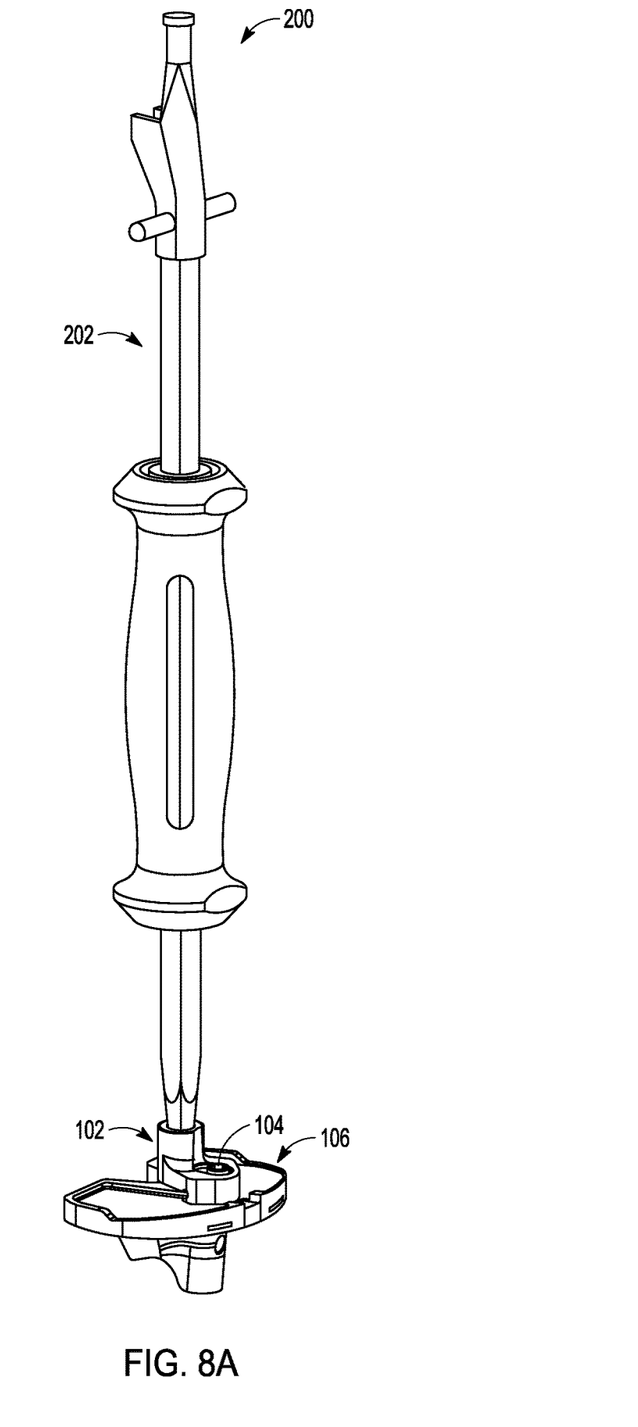
FIG. 8A is a perspective view of a slap hammer connected to the extractor according to an example of the present application.
Figure 8B:
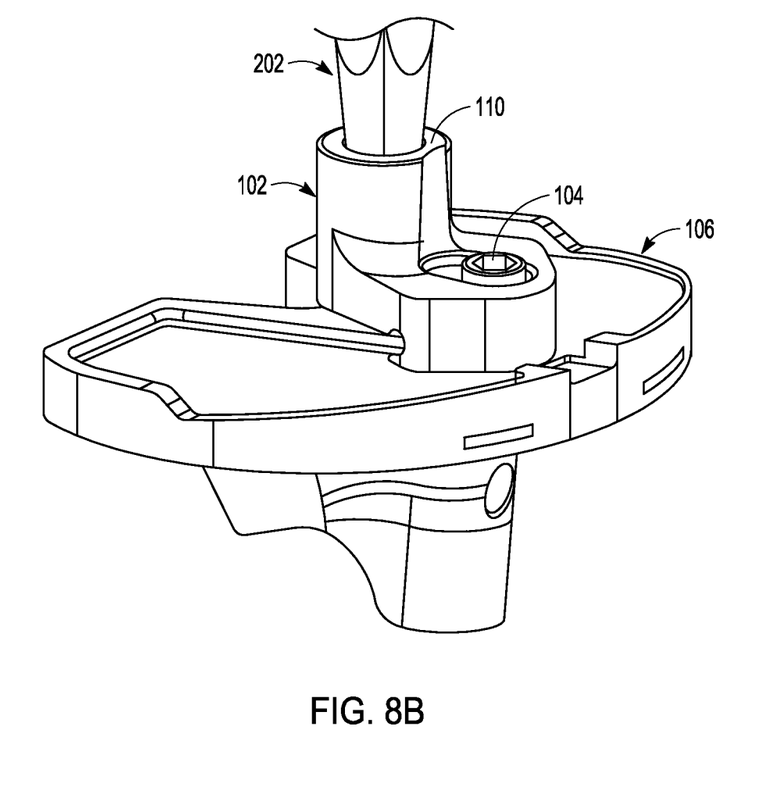
FIG. 8B is an enlarged view of a distal portion of the slap hammer of FIG. 8A connected with the extractor.

FIG. 8A shows a system 200 including a slap hammer 202 in addition to the extractor 102, the fastener 104 and the tibial prosthesis 106 described previously. As shown in FIG. 8B, a distal portion of the slap hammer 202 can be configured to couple with (e.g., thread into) the coupling mechanism 110 of the extractor 102. The multiple points of contact provided by the extractor 102 with the tibial prosthesis 106 as described above allow for the slap hammer 202 to be effectively used in combination with the extractor 102 to facilitate removal of the tibial prosthesis 106 from the tibia (not shown). Orientation of the slap hammer 202 can be guided by the coupling mechanism 110 of the extractor 102 as well as positioning of slap hammer 202 as dictated by the position of the extractor 102 relative to the tibial prosthesis 106. This position of the extractor 102 can be the result of engagement of the one or more features 114 with the boss 120 (see FIGS. 1B and 3) and engagement of the fastener 104 with the extractor 102 and the tibial prosthesis (see FIGS. 1A and 1B)).

According to one example, the present application discloses a method removing a tibial prosthesis (e.g., the tibial prosthesis 106) for a knee arthroplasty. The method can include placing an extractor on a proximal surface of the tibial prosthesis as illustrated in FIGS. 8A and 8B, receiving a fastener with the slot of the extractor 102 (also shown in FIGS. 8A and 8B), threading the fastener into the tibial prosthesis until a head of the fastener engages the extractor (described and shown previously) and engaging the extractor against a boss of the tibial prosthesis (see FIGS. 1B and 3).

The method can additionally include engaging the head of the fastener against the extractor moves the extractor into the engaging the extractor against the boss. Connecting a slap hammer to the extractor as shown in FIGS. 8A and 8B. The boss can be a two-prong boss and the extractor engages a tip portion of each prong of the two-prong boss. The extractor can be configured to insert into a dovetail of the boss.

ADDITIONAL NOTES

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

The claimed invention is:

1. An extractor for a tibial prosthesis comprising:
   a main body comprising:
      a slot configured to receive a fastener that couples the extractor to the tibial prosthesis;
      a groove extending to a lateral side and a medial side of the slot; and
      a projection at least partially defining a side wall of the groove;
   a coupling mechanism connected to the main body and configured to connect with an instrument.

2. The extractor of claim 1, wherein the coupling mechanism includes a projection with a threaded bore.

3. The extractor of claim 1, wherein the extractor is configured to be positionally adjustable proximal-distal on a proximal surface of the tibial prosthesis as defined by the slot and the fastener.

4. The extractor of claim 1, wherein the groove communicates with the slot.

5. The extractor of claim 1, wherein the projection is configured to insert into a dovetail of a boss of the tibial prosthesis.

6. The extractor of claim 5, wherein the boss comprises a two-prong boss and the projection and groove engage a tip portion of each prong of the two-prong boss.

7. The extractor of claim 1, wherein the slot is configured to receive a head of the fastener and a threaded portion of the fastener is received by a threaded bore of the tibial prosthesis.

8. The extractor of claim 7, wherein the main body includes a ramp adjacent to the slot that is engaged by the head of the fastener to move the projection and groove into mating engagement with a coupling feature of the tibial prosthesis.

9. A system for use in a knee arthroplasty comprising:
a tibial prosthesis having a proximal surface, an aperture with an opening to a threaded aperture at the proximal surface, a boss, and a distal surface configured to be disposed on a resected proximal surface of a tibia;
a fastener configured to thread into the threaded aperture of the tibial prosthesis; and
an extractor configured to remove the tibial prosthesis from the tibia, wherein the extractor includes a slot configured to receive a head of the fastener, and wherein the extractor includes one or more features configured to engage the boss.

10. The system of claim 9, further comprising a slap hammer configured to connect to the extractor.

11. The system of claim 9, wherein the extractor is configured to be positionally adjustable proximal-distal on the proximal surface of the tibial prosthesis as defined by the slot and the fastener.

12. The system of claim 9, wherein the one or more features include a groove that extends to a medial and lateral side of the slot, wherein the groove communicates with the slot.

13. The system of claim 9, wherein the one or more features include a projection is configured to insert into a dovetail of the boss.

14. The system of claim 13, wherein the boss comprises a two-prong boss and the one or more features are configured to engage a tip portion of each prong of the two-prong boss.

15. The system of claim 14, wherein the extractor includes a ramp adjacent to the slot that is engaged by the head of the fastener to move the one or more features to engage the boss.

16. A method removing a tibial prosthesis for a knee arthroplasty, the method comprising:
placing an extractor on a proximal surface of the tibial prosthesis;
receiving a fastener with a slot of the extractor;
threading the fastener into the tibial prosthesis until a head of the fastener engages the extractor; and
engaging the extractor against a boss of the tibial prosthesis.

17. The method of claim 16, wherein engaging the head of the fastener against the extractor moves the extractor into the engaging the extractor against the boss.

18. The method of claim 16, further comprising connecting a slap hammer to the extractor.

19. The method of claim 16, wherein the boss comprises a two-prong boss and the extractor engages a tip portion of each prong of the two-prong boss.

20. The method of claim 16, wherein the extractor is configured to insert into a dovetail of the boss.

* * * * *